Feb. 25, 1969 G. KLEIN 3,430,161
DELTA VOLTAGE GENERATORS
Filed March 14, 1967

GERRIT KLEIN INVENTOR.

BY

AGENT

United States Patent Office 3,430,161
Patented Feb. 25, 1969

3,430,161

DELTA VOLTAGE GENERATORS

Gerrit Klein, Emmasingel, Eindhoven, Netherlands, assignor to North American Philips Company, Inc., New York, N.Y., a corporation of Delaware Filed Mar. 14, 1967, Ser. No. 623,085
Claims priority, application Netherlands, Mar. 29, 1966, 6604086
U.S. Cl. 331—111 8 Claims
Int. Cl. H03k 3/286

ABSTRACT OF THE DISCLOSURE

A triangle voltage generator circuit includes first and second capacitors, first, second, third and fourth switches interconnecting said first and second capacitors with an electric supply source, a bistable multivibrator that controls the four switches, and a control device. In the first state of the multivibrator, the first switch is closed to charge the first capacitor and the third switch is also closed to discharge the second capacitor. The second and fourth switches are then open. In the second state of the multivibrator, the first and third switches are open and the second and fourth switches are closed thereby discharging the first capacitor and charging the second capaction, respectively. The voltage across the second capacitor is used to control the charge current of the first capacitor via said control device.

This invention relates to a symmetrical delta voltage generator comprising a first capacitor energized from a supply source via a first switch, in which, when a given voltage is attained across the capacitor, a multivibrator changes state and opens a first switch and closes a second switch so that the capacitor is discharged to a level at which the multivibrator attains the preceding state, whereupon the first switch is closed and the second switch is opened.

Such delta voltage generators are known. By means of the alternate charge and discharge of the first capacitor, a triangular voltage is produced between the fixed changeover levels of the multivibrator. This voltage has a constant amplitude and a frequency which is variable between wide limits and determined by the values of the charging and discharging currents, respectively.

Apart from the requirement of a constant amplitude and a largely variable frequency of the delta voltage, there is often the requirement that the delta voltage should be accurately symmetrical, that is to say that the charging and discharging currents should be accurately equal to each other. These symmetrical delta voltages may be employed in known manner, for example, for producing sinusoidal voltages. There is known a method in which the requirement of symmetry can be satisfied by the equality of the charging current and of the discharging current. In this case a current is controlled by means of a voltage derived from a resistor. For the present purpose, for example, the charging current may be controlled by a current which is the discharging current itself during the discharge and which produces across a resistor a voltage which controls an amplifying element.

Figure 1:
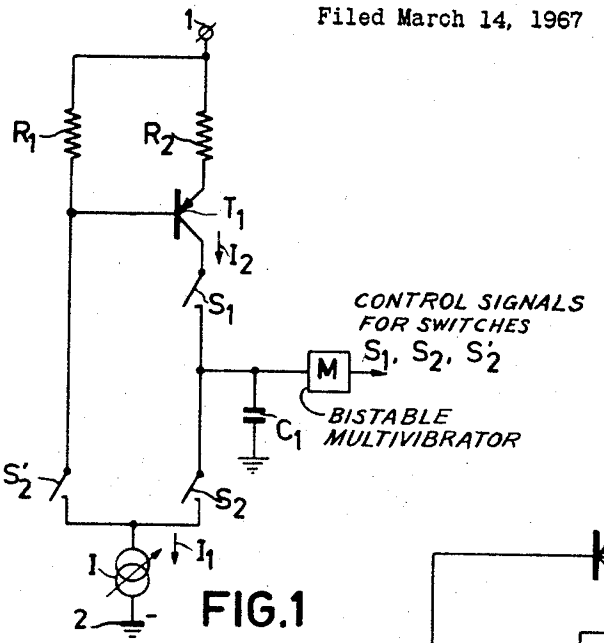
Figure 2:
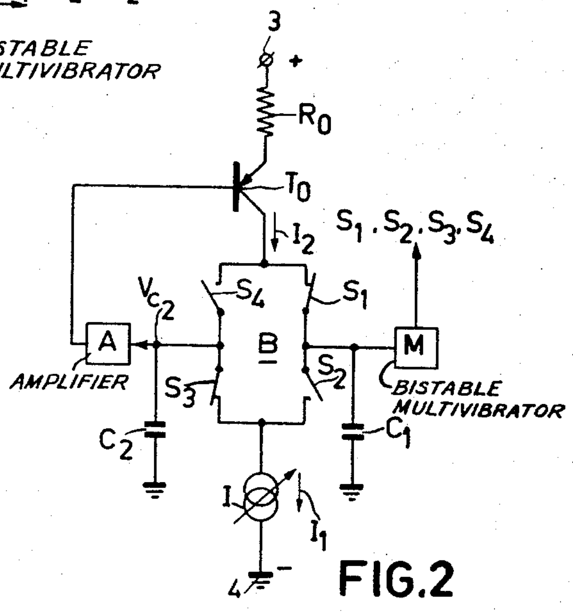

The invention will be described in greater detail in connection with the accompanying drawing, in which:

FIG. 1 schematically illustrates a first circuit for generating triangular voltage waveforms;

FIG. 2 schematically shows one embodiment of the invention; and

Figure 3:
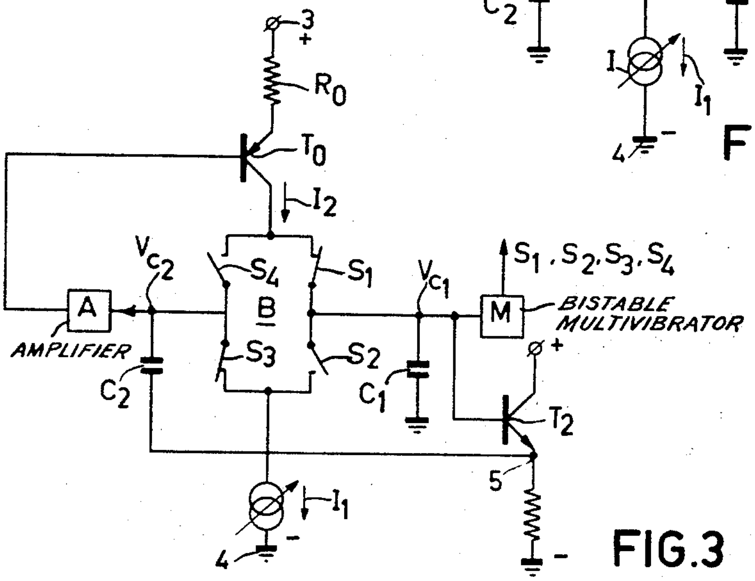

FIG. 3 schematically shows a second embodiment of the invention.

FIG. 1 of the drawing shows a potential solution wherein $C_1$ designates the first capacitor, $S_1$ the first switch, $S_2$ the second switch, and M the multivibrator having two fixed changeover levels.

$S'_2$ designates a switch. The switches $S_1$, $S_2$ and $S'_2$ may be mechanical relays or electronic switches controlled by the multivibrator.

$T_1$ is an emitter-follower transistor having resistors $R_1$ and $R_2$.

I designates a current source and reference numerals 1 and 2 designate the terminals of a voltage supply source. $I_1$ is the discharging current and $I_2$ is the charging current. When the switches $S_1$ and $S'_2$ are closed, the capacitor $C_1$ is charged. At the same time the current $I_1$ passes through the resistor $R_1$ and the switch $S'_2$. Across the resistor $R_1$ there is thus produced a voltage which determines the adjustment of the transistor $T_1$. At the same time, the charging current $I_2$ is determined and, when $R_1 \approx R_2$, the currents $I_1$ and $I_2$ are approximately equal to each other. The further operation will be evident. When the voltage across the capacitor $C_1$ attains the switching level of the multivibrator M, the latter switches over and closes the switch $S_2$ and opens the switches $S_1$ and $S'_2$, so that the capacitor $C_1$ discharges by a current $I_1$. At the second switching level of the multivibrator, the preceding state is restored and so on. In this way a substantially symmetrical delta-voltage is produced across the capacitor $C_1$.

The disadvantage of the device shown in FIG. 1 is that at low currents, the control voltage across the resistor $R_1$ is also low, so that any variations of rest voltages, for example, the supply voltage, have a great influence on the charging current. With a low frequency of the delta voltage the required current is low, so that in the low frequency range inadmissible variations of the produced delta voltage may occur.

An object of the invention is to obviate this disadvantage and it is characterized in that there is provided a second capacitor $C_2$, a third and a fourth switch ($S_3$, $S_4$), the second capacitor $C_2$ being discharged across the third switch $S_3$ when the first capacitor $C_1$ is charged, and is charged across the fourth switch $S_4$ when the first capacitor $C_1$ is discharged, and in that there is provided a control-device (A, $T_0$) by means of which the charging current is controlled in accordance with the voltage across the second capacitor.

Referring to FIG. 2, reference numeral $C_1$ designates the first capacitor, $S_1$ the first switch and $S_2$ the second switch. Reference numeral M designates the multivibrator having two fixed change-over levels determining the peak value of the delta voltage, $C_2$ the second capacitor, $S_3$ the third switch and $S_4$ the fourth switch. Reference numeral A designates a control-amplifier, the input of which is connected to the capacitor $C_2$ and the output of which is connected to the base of a transistor $T_0$. The transistor $T_0$ is an emitter-follower and the emitter is connected through a resistor $R_0$ to a first terminal 3 of a voltage supply source. The collector is connected to a parallel combination B of the switch $S_4$ in series with $S_3$, and switch $S_1$ in series with $S_2$. The other end of the parallel combination B is connected through a current source I to a second terminal 4 of the voltage supply source.

A point lying between the switches $S_1$ and $S_2$ is connected to the first capacitor $C_1$, and a point lying between the switches $S_3$ and $S_4$ is connected to the second capacitor $C_2$. The first capacitor $C_1$ is finally connected to the input of multivibrator M. The multivibrator output controls the preferably electronic switches $S_1$, $S_2$, $S_3$ and $S_4$.

The current source I supplies a current $I_1$ to the parallel combination B, which current is approximately equal to the discharging current. The transistor $T_0$ supplies a current $I_2$, approximately equal to the charging current, to the parallel combination B.

The invention is based on the recognition of the fact that in this device, when the capacitor $C_1$ is not charged or discharged, the currents $I_1$ and $I_2$ are used for charging or discharging, respectively, the second capacitor $C_2$. As a first approximation, the capacitor $C_2$ may be considered to be much greater than the capacitor $C_1$. The average voltage $V_{c2}$ of the second capacitor is used for controlling the current $I_2$. For this purpose the switches $S_2$ and $S_4$ are open and the switches $S_1$ and $S_3$ are closed during the charge of the first capacitor $C_1$ and the discharge of the second capacitor $C_2$ respectively, whereas during the discharge of the first capacitor $C_1$ and the charge of the capacitor $C_2$ the switches $S_2$ and $S_4$ are closed and the switches $S_1$ and $S_3$ are opened.

Apart from a ripple at the capacitor $C_2$ and the leakage currents which may occur in the circuit, it follows that for the first capacitor $C_1$ $I_1\tau=I_2(T-\tau)$ and that for the second capacitor $C_2$ $I_2\tau=I_1(T-\tau)$, wherein $\tau$ is the time during which the capacitor $C_1$ is discharged and the capacitor $C_2$ is charged, and $(T-\tau)$ is the time during the capacitor $C_1$ is charged and the capacitor $C_2$ is discharged. T designates the total period of the delta voltage produced. By solving these equations we find that $I_1=I_2$ and $\tau=T/2$, which means that, as desired, the discharging and charging currents are equal to each other during the half periods.

It should be noted here that the values of the leakage currents involved in the use of switching transistors $S_1$, $S_2$, $S_3$ and $S_4$ and the base current of an input transistor of the multivibrator M and of the control-amplifier A determine to what extent the above-mentioned equations apply effectively.

It is found that when silicon transistors are employed, the leakage currents are very low, while the symmetrical structure of the device provides, in addition, a certain amount of compensation.

A second restrictive factor occurs because the current $I_2$ is readjusted during the charge of the capacitor $C_1$ by the voltage of the capacitor $C_2$, which has a ripple. By maintaining a low level of the loop amplification of the control-amplifier A, the harmful effect of the ripple may be reduced. However, this involves a prolongation of the control time. This also affects the adjustment of the delta voltage to a new periodicity, for example, by adjusting the current source I. With a longer control time, the required time of adjustment is also longer. In practice this control time may be kept within reasonable limits, for example, to within 10 periods of the resultant delta voltage by simultaneous and equal variations of the currents $I_1$ and $I_2$, for example, by varying the resistor $R_0$ simultaneously with the adjustment of the current source I.

FIG. 3 shows a further development of a device according to the invention in which the disturbing effect of the ripple voltage of the second capacitor $C_2$ is eliminated. For this purpose the side of the capacitor $C_2$ remote from the control amplifier A is connected to a load terminal 5 that follows the voltage of the first capacitor $C_1$. In this figure the same references are used as in FIG. 2. The side of the second capacitor $C_2$ remote from the control amplifier A is connected to the emitter of an emitter-follower transistor $T_2$, whose base is controlled by the voltage of the first capacitor $C_1$. The capacitor $C_2$ is approximately equal to the capacitor $C_1$. Since the lower side of the capacitor $C_2$ is connected to the emitter of the transistor $T_2$, which accurately follows the voltage $V_{c1}$ of the capacitor $C_1$, the voltage $V_{c2}$ of the capacitor $C_2$ is free of ripple. In practice, the capacitor $C_2$ will be slightly greater than the capacitor $C_1$ in order to compensate for some lack of follow-up of the voltage $V_{c1}$ of the capacitor $C_1$. In this way the ripple of the capacitor $C_2$ is restricted for example, to about 1% of the voltage $V_{c1}$. Compared with the device of FIG. 2, a greater amplification of the control amplifier A may be chosen so that the control time is reduced.

The device of FIG. 3 has a further advantage in that since the capacitor $C_2$ need not be much greater than the capacitor $C_1$, the lowest frequency is not determined or restricted by the capacitor $C_2$, as in the device of FIG. 2.

What is claimed is:

1. A symmetrical delta voltage generator comprising, an energy supply source, a first capacitor, a first switch, means coupling said first capacitor to said supply source by means of said first switch for charging said capacitor, a multivibrator having an input coupled to said capacitor so that when a given voltage is developed across the first capacitor the multivibrator changes state, a second switch coupled to said first capacitor, said first and second switches being controlled by the output of said multivibrator so that said given voltage changes the multivibrator and opens the first switch and closes the second switch, whereby the first capacitor is discharged to a level at which the multivibrator returns to the preceding state whereby the first switch is closed and the second switch is opened, a second capacitor, a third switch and a fourth switch coupled to said second capacitor so that the second capacitor is discharged by means of the third switch when the first capacitor is charged and is charged by means of the fourth switch when the first capacitor is discharged, and a control device coupled to said second capacitor by means of which the charging current of said first capacitor is controlled in accordance with the voltage across the second capacitor.

2. A symmetrical delta voltage generator as claimed in claim 1 further comprising means connecting one terminal of the second capacitor remote from the control device to a junction point in the circuit that follows the voltage across the first capacitor.

3. A circuit for generating a periodic voltage having a triangular waveform comprising, a source of electric energy, first and second capacitors, first, second, third and fourth switching elements, a bistable device having first and second states determined by the voltage level at the input thereof, means connecting said first capacitor to said first and second switching elements and said second capacitor to said third and fourth switching elements so that said first and second capacitors are respectively charged by means of said first and fourth switching elements and said energy source and are discharged by means of said second and third switching elements, respectively, means coupling said first capacitor to the input of said bistable device for switching said bistable device between said first and second states as a function of the voltage across said first capacitor, a control device having its input coupled to said second capacitor and its output coupled to said first capacitor so that the charge current of said first capacitor is determined by the voltage across said second capacitor, and means coupling the output of said bistable device to the switching elements to control said switching elements so that said first and third elements are closed and said second and fourth elements are opened in one state of said bistable device and said first and third elements are opened and second and fourth elements are closed in the other state of the bistable device.

4. A circuit as claimed in claim 3 further comprising, first means connecting said first and second switching elements in series with said energy source and connecting said first capacitor to the common junction between said elements, and second means connecting said third and fourth switching elements in series with said energy source and in parallel with said first and second switching elements, said second capacitor being connected to the common junction between said third and fourth elements.

5. A circuit as claimed in claim 4 wherein said control device includes a transistor connected in series between said energy source and the parallel combination of said switching elements, and means for coupling the base of said transistor to said second capacitor.

6. A circuit as claimed in claim 3 wherein one terminal of said second capacitor is coupled to the input of said control device and the other terminal of said second capacitor is coupled to a junction point in the circuit that follows the voltage variations across said first capacitor.

7. A circuit as claimed in claim 6 further comprising a transistor connected as an emitter-follower with its emitter connected to said other terminal of the second capacitor and its base connected to said first capacitor.

8. A circuit as claimed in claim 3 wherein said control device includes a transistor connected in series with said first switching element and said first capacitor in the charge path thereof, said first and second capacitors being chosen to cooperate with said transistor so that the charge current of said first capacitor is substantially equal to its discharge current.

References Cited

UNITED STATES PATENTS

| | | | |
|---|---|---|---|
| 2,888,579 | 5/1959 | Wanlass | 331—113 X |
| 2,894,215 | 7/1959 | Toy | 331—113 X |
| 3,239,779 | 3/1966 | Rywak | 331—113 |

ROY LAKE, *Primary Examiner.*

SIEGFRIED H. GRIMM, *Assistant Examiner.*

U.S. Cl. X.R.

331—113, 143